US011486647B1

(12) United States Patent
Bowers et al.

(10) Patent No.: US 11,486,647 B1
(45) Date of Patent: Nov. 1, 2022

(54) INTERNAL DRIVE SYSTEM FOR AIR-COOLED HEAT EXCHANGERS

(71) Applicant: Hudson Products Corporation, Ball Ground, GA (US)

(72) Inventors: Charles Bowers, Tulsa, OK (US); Robert Rhodes, Tulsa, OK (US); Bailey Meadows, Tulsa, OK (US); Sean Surber, Tulsa, OK (US); Nickolas Craig, Tulsa, OK (US)

(73) Assignee: Hudson Products Corporation, Ball Ground, GA (US)

(*) Notice: Subject to any disclaimer, the term of this patent is extended or adjusted under 35 U.S.C. 154(b) by 740 days.

(21) Appl. No.: 16/400,151

(22) Filed: May 1, 2019

Related U.S. Application Data

(60) Provisional application No. 62/665,458, filed on May 1, 2018.

(51) Int. Cl.
F24H 3/02 (2022.01)
F28D 1/02 (2006.01)
F28F 13/06 (2006.01)
F16H 7/12 (2006.01)
F16H 7/02 (2006.01)
F16H 7/08 (2006.01)

(52) U.S. Cl.
CPC ............... *F28D 1/024* (2013.01); *F16H 7/02* (2013.01); *F16H 7/1254* (2013.01); *F28F 13/06* (2013.01); *F16H 2007/0865* (2013.01); *F28F 2250/08* (2013.01)

(58) Field of Classification Search
CPC .... F28D 1/024; F16H 7/02; F16H 2007/0865; F28F 13/06; F28F 2250/08
USPC ......................................................... 165/121
See application file for complete search history.

(56) References Cited

U.S. PATENT DOCUMENTS

| 2010/0193163 A1* | 8/2010 | Rollins | F04D 25/0606 417/423.1 |
| 2010/0274396 A1* | 10/2010 | Yang | F25B 21/02 62/239 |
| 2014/0250932 A1* | 9/2014 | Martinez, Jr. | B60H 1/00264 62/239 |
| 2014/0366815 A1* | 12/2014 | Lu | F01P 3/18 123/41.1 |

* cited by examiner

Primary Examiner — Davis D Hwu
(74) Attorney, Agent, or Firm — Cook Alex Ltd.

(57) ABSTRACT

An air-cooled heat exchanger includes a plenum having an intake and a discharge, a cooling tube assembly inside the plenum, a fan assembly that has a fan, an engine positioned outside the plenum, and an internal drive assembly. The internal drive assembly is configured to transfer torque from the engine to the fan. The internal drive assembly is contained inside the plenum.

18 Claims, 6 Drawing Sheets

INTERNAL DRIVE SYSTEM FOR AIR-COOLED HEAT EXCHANGERS

RELATED APPLICATIONS

The present application claims the benefit of U.S. Provisional Patent Application Ser. No. 62/665,458 filed May 1, 2018 entitled "Internal Drive System for Air-Cooled Heat Exchangers," the entire disclosure of which is herein incorporated by reference thereto.

FIELD OF THE INVENTION

The present invention generally relates to air-cooled heat exchangers, and more particularly, but not by way of limitation, to an improved system for transmitting torque from an engine to the fan of the air-cooled heat exchanger.

BACKGROUND OF THE INVENTION

Air-cooled heat exchangers are used in a wide variety of industrial applications. A process fluid, either a gas or a liquid, is passed through a series of cooling tubes while air is mechanically passed over the exterior of the cooling tubes. The air absorbs heat from the cooling tubes, thereby lowering the temperature of the fluid within the tubes. The cooling tubes may include lateral or axial fins to aid in heat transfer.

As noted in the PRIOR ART air-cooled heat exchanger 200 depicted in FIG. 1, a large fan 202 forces or draws air at ambient conditions through a plenum 204 fabricated from a series of panels supported by an underlying frame assembly 206. The plenum 204 directs the ambient air through the cooling tube assembly 208, which includes header boxes located on opposite sides of the plenum 204. The header boxes include inlets and outlets to permit the flow of the process fluid through the heat exchanger. In some applications, a series of adjustable louvers 210 are positioned downstream and/or upstream from the cooling tubes to control the flow of air across the cooling tube assembly 208.

The fan 202 is typically driven by an external engine 212. In the past, a fan shaft 214 extends from the fan 202 through the cooling tubes assembly 208 and plenum 204 to a drive assembly 216 on the exterior of the air-cooled heat exchanger 200 proximate the engine 212. The drive assembly 216 may include a series of intermediate shafts, sheaves and bearings that transfer torque from the engine 212 to the fan shaft 214 and fan 202. The drive assembly 216 protected by a safety cover 218.

Although widely adopted, the use of an external drive assembly 216 presents several problems. In many installations, there is limited space between the air-cooled heat exchanger 200 and the engine 212. The space is occupied by the piping that carries process fluids to and from the air-cooled heat exchanger. The limited amount of space between the engine 212 and the air-cooled heat exchanger 200 complicates the inspection and repair of the drive assembly 216. Additionally, the drive assembly and safety cover 218 must be installed once the air-cooled heat exchanger 200 has been located in the operational position, which increases the cost and complexity of the installation process. There is, therefore, a need for an improved system for connecting the engine and fan on an air-cooled heat exchanger. The presently preferred embodiments are directed to these and other deficiencies in the prior art.

SUMMARY OF THE INVENTION

In an exemplary embodiment, an air-cooled heat exchanger includes a plenum having an intake and a discharge, a cooling tube assembly inside the plenum, a fan assembly that has a fan, an engine positioned outside the plenum, and an internal drive assembly. The internal drive assembly is configured to transfer torque from the engine to the fan. The internal drive assembly is contained inside the plenum.

In another embodiment, the present invention includes an air-cooled heat exchanger that has a plenum having an intake and a discharge, a cooling tube assembly inside the plenum, and a fan assembly connected to the plenum. The fan assembly includes a fan. The air-cooled heat exchanger also has an engine positioned outside the plenum, and an internal drive assembly contained inside the plenum. The internal drive assembly includes a fan shaft that has a first end and a second end, where the first end of the fan shaft is connected to the fan and the second end of the fan shaft is connected to a fan shaft sheave. The internal drive assembly also includes an intermediate drive shaft that has a first end and a second end, an intermediate drive shaft sheave connected to the first end of the intermediate drive shaft, and a drive belt. The drive belt connects the fan shaft sheave, idler pulley and intermediate drive shaft sheave.

In yet another embodiment, an air-cooled heat exchanger has a plenum having an intake and a discharge, a cooling tube assembly inside the plenum, a fan assembly connected to the plenum, where the fan assembly includes a fan, an engine positioned outside the plenum, and an internal drive assembly configured to transfer torque from the engine to the fan. In this embodiment, the internal drive assembly is contained inside the plenum between the cooling tube assembly and the fan.

WRITTEN DESCRIPTION

Figure 1:
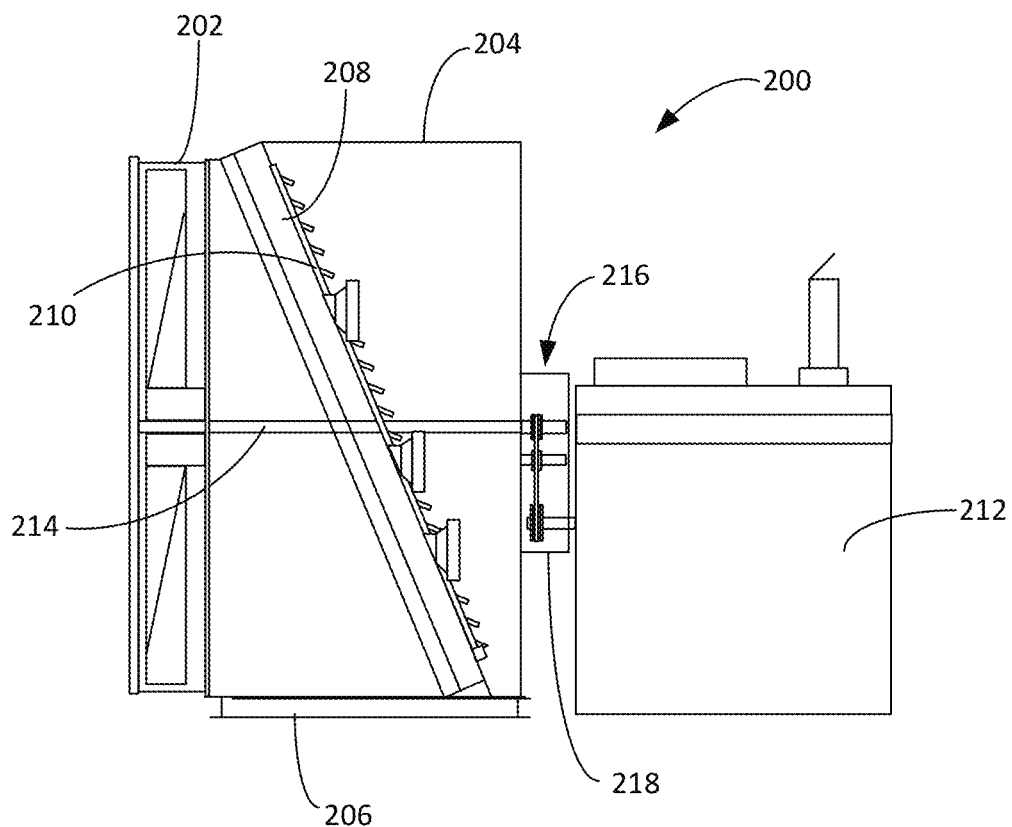
FIG. 1 provides a side view of a PRIOR ART air-cooled heat exchanger and engine with an external drive assembly.

Referring to FIGS. 2-6, shown therein are various depictions of an air-cooled heat exchanger 100 constructed in accordance with an exemplary embodiment. The air-cooled heat exchanger 100 generally includes a plenum 102, a fan assembly 104, cooling tubes assembly 106 and an internal drive assembly 108. Portions of the plenum 102 and cooling tubes assembly 106 have been removed in FIGS. 3-6 to improve the illustration of the placement and operation of the internal drive assembly 108. As depicted, the air-cooled heat exchanger 100 is configured as a forced-draft unit in which ambient air is forced by the fan assembly 104 into the front of the plenum 102, through the cooling tubes assembly 104, and out the top of the plenum 102. In alternate embodiments, the air-cooled heat exchanger 100 is an induced draft air design in which air is drawn across the cooling tubes assembly 106.

The plenum 102 includes a series of panels 110 that are attached to a frame assembly 112. The panels 110 and frame assembly 112 are preferably constructed from metal or other durable materials. The frame assembly 112 may include a base constructed from "I-beams" and a structural skeleton that includes a plurality of trusses, struts and beams (not separately designated). The plenum 102 includes an intake and a discharge that define an airflow path through the plenum 102.

The fan assembly 104 includes a fan 114 and a fan shroud 116 that is connected to the plenum 102. The internal drive assembly 108 includes a fan shaft 118 that is connected to the fan 114 on a first end and to a fan shaft sheave 120 on a second end. The fan shaft 118 is supported by one or more bearings that facilitate and control the rotational movement of the fan shaft 118. The internal drive assembly 108 also includes an idler shaft 122, idler pulley 124, intermediate drive shaft 126, intermediate drive shaft sheave 128 and drive belt 130. The idler shaft 122 and idler pulley 124 can be used to adjust the tension of the drive belt 130.

The intermediate drive shaft 126 extends to the exterior of the air-cooled heat exchanger 100 through the cooling tube assembly 106 and rear panel 110 of the plenum 102. There, the intermediate drive shaft 126 is connected by a coupler 132 to an output shaft 134 from the engine 136. In exemplary embodiments, the intermediate drive shaft 126 is linearly aligned with the output shaft 134 of the engine 136. In alternate embodiments, the intermediate drive shaft 126 and the output shaft 134 are constructed as a single, unitary shaft.

During use, the engine 136 rotates the output shaft 134, which in turn transfers torque to the intermediate drive shaft 126 through the coupler 132. The torque is then transferred through the internal drive assembly 108 to rotate the fan 114. In exemplary embodiments, the internal drive assembly 108 serves a reducer that increases torque while lowering rotational speed. As the fan 114 rotates, it forces (or induces in alternate designs) ambient air through the fan shroud 116 into the plenum 102.

Figure 2:
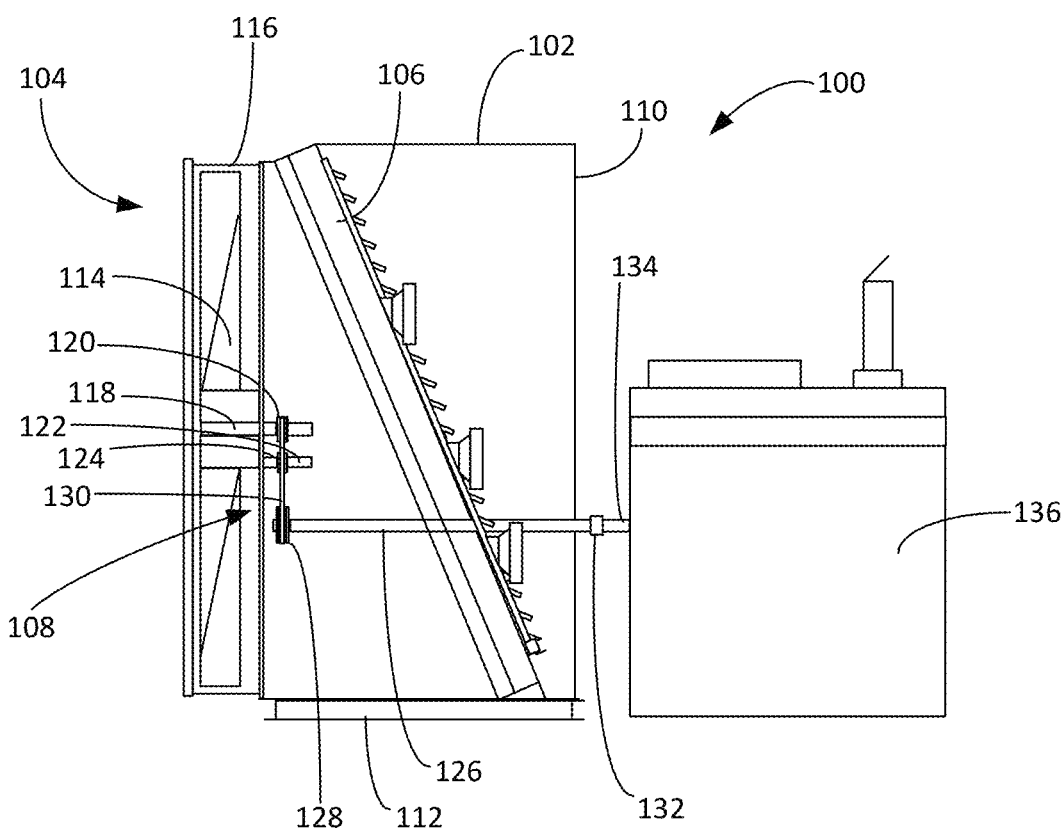
FIG. 2 is a side view of an air-cooled heat exchanger with an internal drive assembly, constructed in accordance with an exemplary embodiment.
Figure 3:
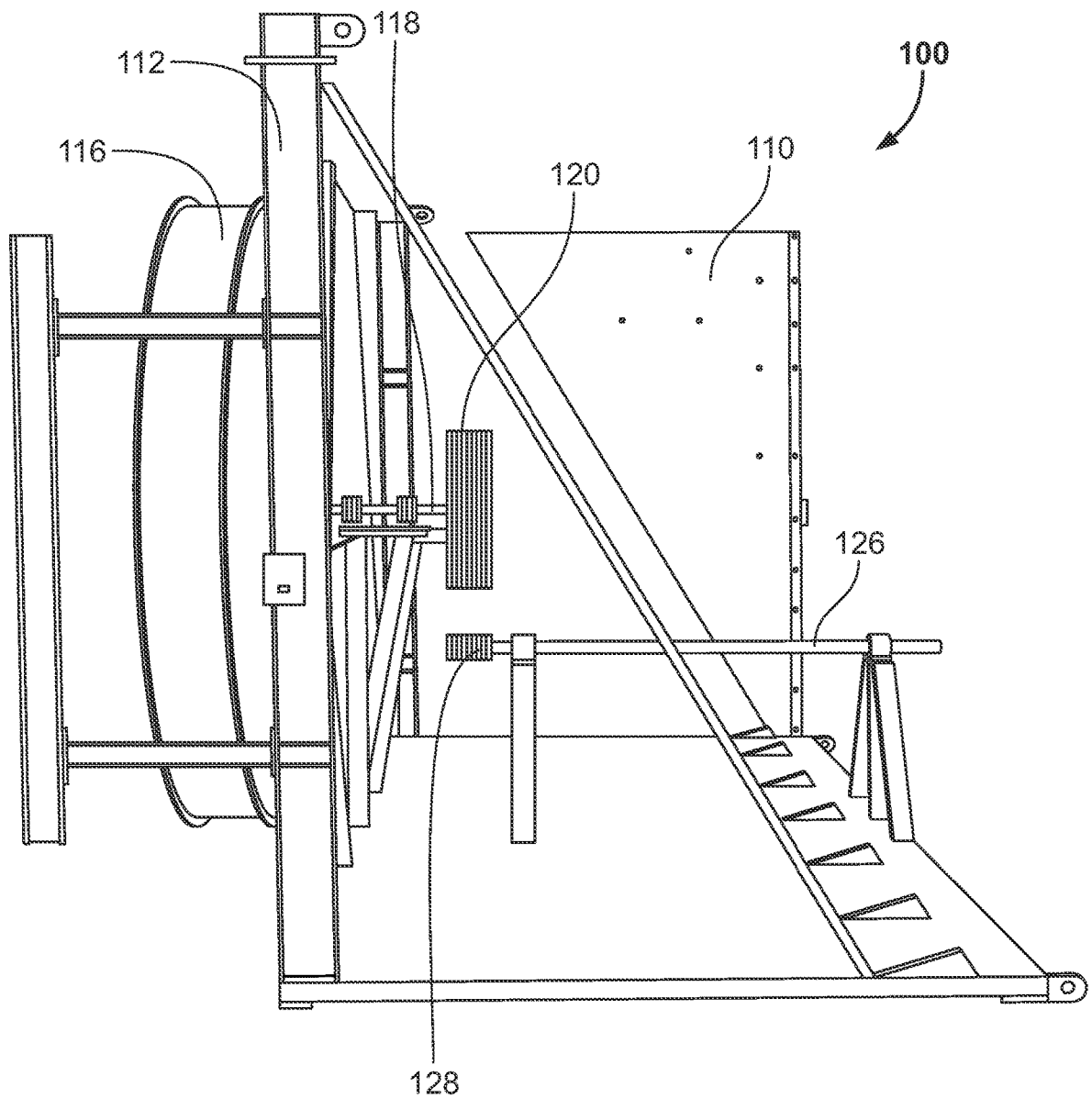
FIG. 3 is a side view of an air-cooled heat exchanger with an internal drive assembly, constructed in accordance with an exemplary embodiment.
Figure 4:
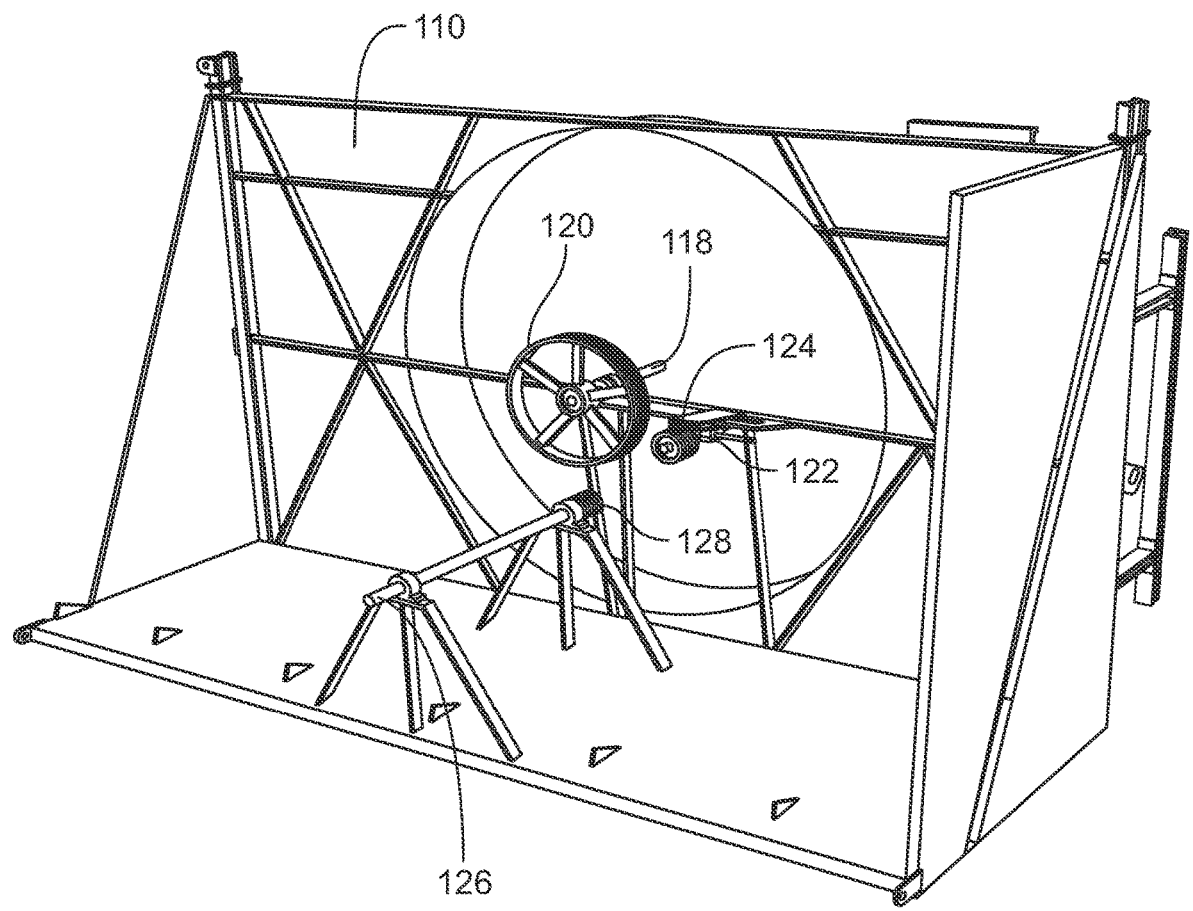
FIG. 4 is a rear perspective view of the air-cooled heat exchanger of FIG. 3.
Figure 5:
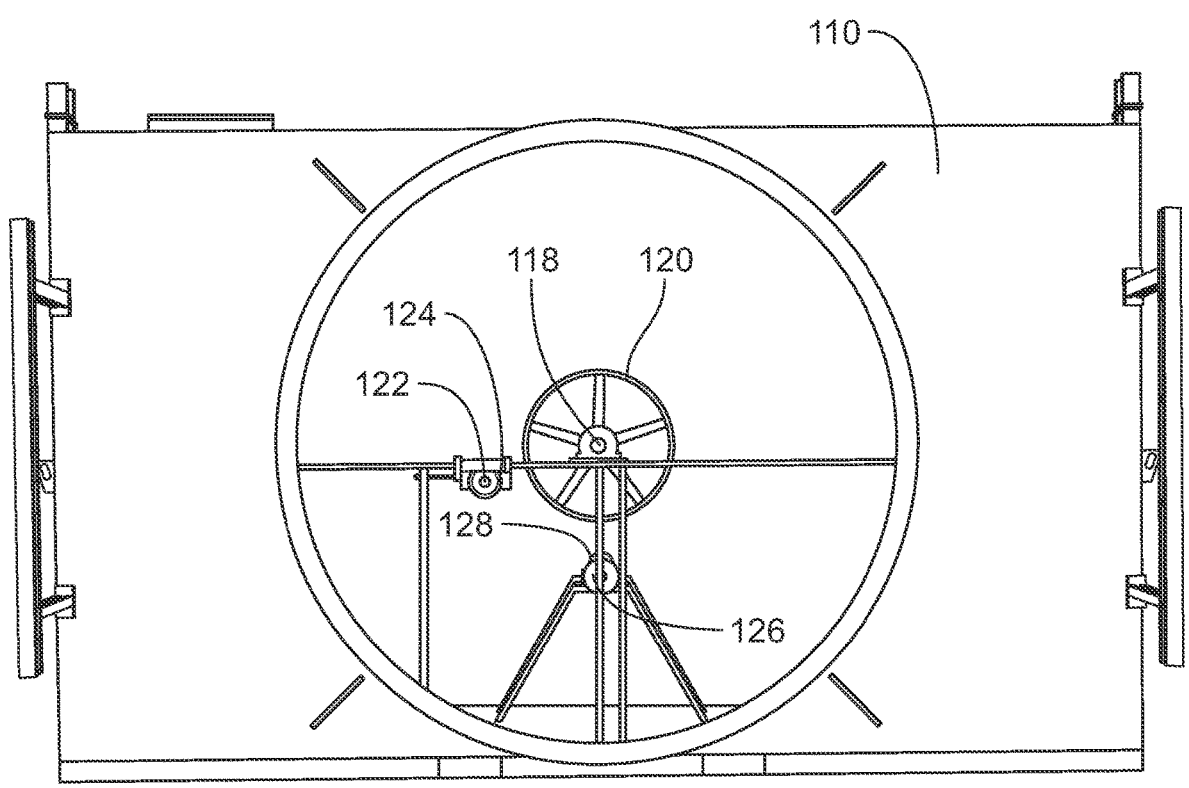
FIG. 5 is a front view of the air-cooled heat exchanger of FIG. 3.
Figure 6:
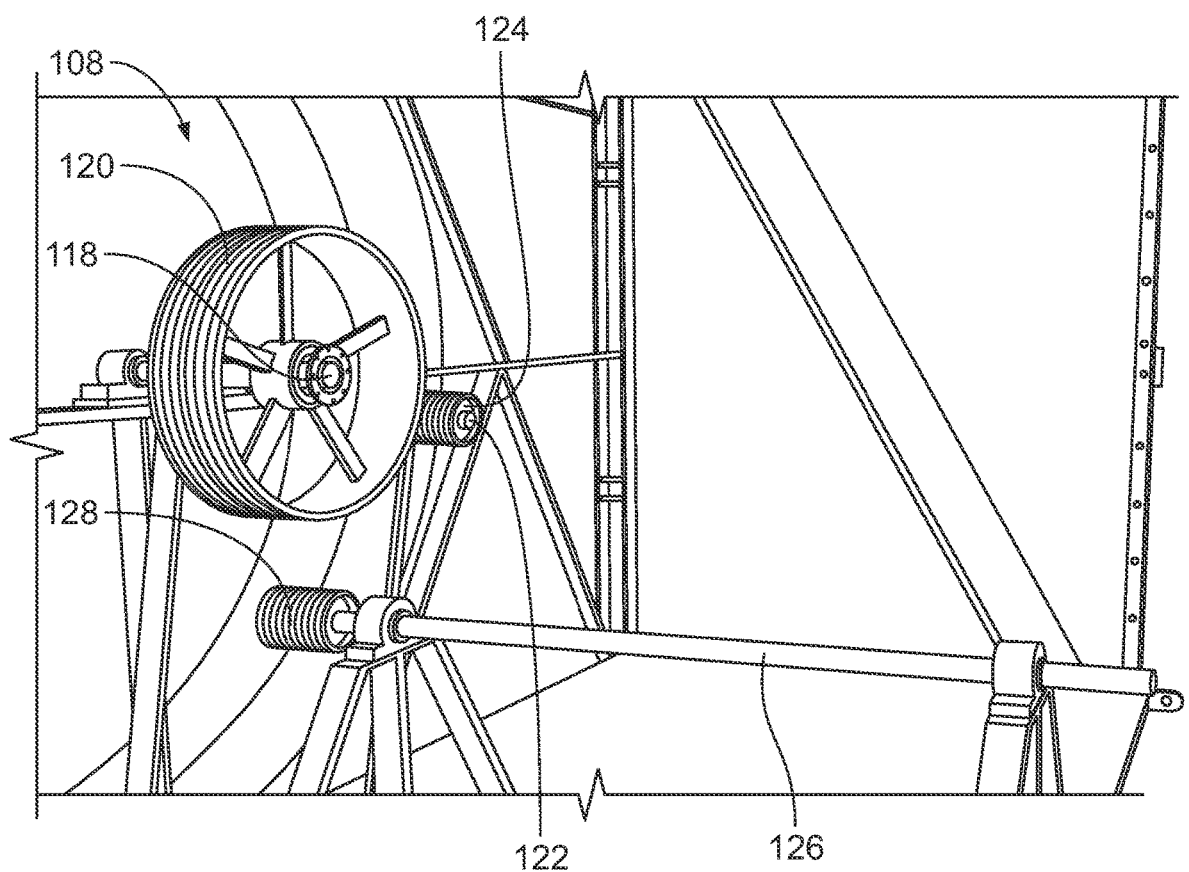
FIG. 6 is a close-up perspective view of the internal drive assembly of the air-cooled heat exchanger of FIG. 3.

Notably, the internal drive assembly 108 resides inside the air-cooled heat exchanger 100 near the fan assembly 104. As depicted in FIG. 2, the internal drive assembly 108 is positioned between the fan assembly 108 and the cooling tubes assembly 106. In this position, the internal drive assembly 108 is protected by the plenum 102, which obviates the need for the safety covers found in the prior art designs. Additionally, the internal drive assembly 108 can be easily inspected through the fan shroud 116 and there is ample space within the air-cooled heat exchanger 100 to easily service the various components of the internal drive assembly 108. Lastly, the novel placement of the internal drive assembly 108 inside the air-cooled heat exchanger 100 increases the available space between the plenum 102 and the engine 136, which provides more space for piping and other equipment. Thus, the internal drive assembly 108 overcomes many of the deficiencies of the prior art external placement of the drive assembly.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be at least ±20%, or at least ±10%, or at least ±5% of the base value.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms expressed herein and within the appended claims. It will be appreciated by those skilled in the art that the teachings of the present invention can be applied to other systems without departing from the scope and spirit of the present invention.

What is claimed is:

1. An air-cooled heat exchanger comprising:
a plenum having an intake and a discharge;
a cooling tube assembly inside the plenum;
a fan assembly connected to the plenum, wherein the fan assembly includes a fan;
an engine positioned outside the plenum; and
an internal drive assembly configured to transfer torque from the engine to the fan, wherein the internal drive assembly is contained inside the plenum and the internal drive assembly comprises:
a fan shaft that has a first end and a second end, wherein the first end of the fan shaft is connected to the fan;
a fan shaft sheave connected to the second end of the fan shaft;
an idler shaft;
an idler pulley connected to the idler shaft;
an intermediate drive shaft that has a first end and a second end, wherein the second end of the intermediate drive shaft is connected to the engine;
an intermediate drive shaft sheave connected to the first end of the intermediate drive shaft; and
a drive belt, wherein the drive belt connects the fan shaft sheave, idler pulley and intermediate drive shaft sheave.

2. The air-cooled heat exchanger of claim 1, wherein the internal drive assembly is positioned within the plenum between the fan and the cooling tube assembly.

3. The air-cooled heat exchanger of claim 1, wherein the engine includes an output shaft that extends through the plenum to the internal drive assembly.

4. The air-cooled heat exchanger of claim 1, wherein the idler shaft and idler pulley are configured to controllably adjust the tension of the drive belt.

5. The air-cooled heat exchanger of claim 1, wherein the engine comprises an engine output shaft and wherein the second end of the intermediate drive shaft is connected to the engine output shaft.

6. The air-cooled heat exchanger of claim 5, wherein the intermediate drive shaft is connected to the engine output shaft with a shaft coupler that resides between the plenum and the engine.

7. The air-cooled heat exchanger of claim 6, wherein the intermediate drive shaft extends through the cooling tubes assembly.

8. The air-cooled heat exchanger of claim 6, wherein the engine output shaft and the intermediate drive shaft are linearly aligned.

9. An air-cooled heat exchanger comprising:
a plenum having an intake and a discharge;
a cooling tube assembly inside the plenum;
a fan assembly connected to the plenum, wherein the fan assembly includes a fan;
an engine positioned outside the plenum; and
an internal drive assembly contained inside the plenum, wherein the internal drive assembly comprises:
a fan shaft that has a first end and a second end, wherein the first end of the fan shaft is connected to the fan;
a fan shaft sheave connected to the second end of the fan shaft;
an intermediate drive shaft that has a first end and a second end;
an intermediate drive shaft sheave connected to the first end of the intermediate drive shaft; and
a drive belt, wherein the drive belt connects the fan shaft sheave, an idler pulley and the intermediate drive shaft sheave.

10. The air-cooled heat exchanger of claim 9, wherein the internal drive assembly is positioned within the plenum between the fan and the cooling tube assembly.

11. The air-cooled heat exchanger of claim 10, wherein the intermediate drive shaft extends through the cooling tubes assembly.

12. The air-cooled heat exchanger of claim 9, wherein the internal drive assembly further comprises:
an idler shaft;
an idler pulley connected to the idler shaft; and
wherein the idler shaft and idler pulley are configured to controllably adjust the tension of the drive belt.

13. The air-cooled heat exchanger of claim 9, wherein the engine comprises an engine output shaft and wherein the second end of the intermediate drive shaft is connected to the engine output shaft.

14. The air-cooled heat exchanger of claim 13, wherein the intermediate drive shaft is connected to the engine output shaft with a shaft coupler that resides between the plenum and the engine.

15. An air-cooled heat exchanger comprising:
a plenum having an intake and a discharge;
a cooling tube assembly inside the plenum;
a fan assembly connected to the plenum, wherein the fan assembly includes a fan;
an engine positioned outside the plenum; and
an internal drive assembly configured to transfer torque from the engine to the fan, wherein the internal drive assembly is contained inside the plenum between the cooling tube assembly and the fan and the internal drive assembly comprises:
a fan shaft that has a first end and a second end, wherein the first end of the fan shaft is connected to the fan;
a fan shaft sheave connected to the second end of the fan shaft;
an intermediate drive shaft that has a first end and a second end;
an intermediate drive shaft sheave connected to the first end of the intermediate drive shaft; and
a drive belt, wherein the drive belt connects the fan shaft sheave, an idler pulley and the intermediate drive shaft sheave.

16. The air-cooled heat exchanger of claim 15, wherein the intermediate drive shaft extends through the cooling tubes assembly.

17. The air-cooled heat exchanger of claim 15, wherein the engine comprises an engine output shaft and wherein the second end of the intermediate drive shaft is connected to the engine output shaft.

18. The air-cooled heat exchanger of claim 17, wherein the intermediate drive shaft is connected to the engine output shaft with a shaft coupler that resides between the plenum and the engine.

* * * * *